(12) United States Patent
Calvas et al.

(10) Patent No.: US 12,505,329 B2
(45) Date of Patent: Dec. 23, 2025

(54) ELECTRONIC MODULE FOR CHIP CARD

(71) Applicant: Smart Packaging Solutions, Rousset (FR)

(72) Inventors: Bernard Calvas, Rousset (FR); Pierre Volpe, Rousset (FR)

(73) Assignee: Smart Packaging Solutions, Rousset (FR)

( * ) Notice: Subject to any disclaimer, the term of this patent is extended or adjusted under 35 U.S.C. 154(b) by 0 days.

(21) Appl. No.: 17/292,235

(22) PCT Filed: Oct. 9, 2019

(86) PCT No.: PCT/EP2019/077275
§ 371 (c)(1),
(2) Date: May 7, 2021

(87) PCT Pub. No.: WO2020/094320
PCT Pub. Date: May 14, 2020

(65) Prior Publication Data
US 2021/0406636 A1 Dec. 30, 2021

(30) Foreign Application Priority Data
Nov. 8, 2018 (FR) ........................ 1860297

(51) Int. Cl.
*G06K 19/077* (2006.01)

(52) U.S. Cl.
CPC . *G06K 19/07754* (2013.01); *G06K 19/07769* (2013.01); *G06K 19/07775* (2013.01)

(58) Field of Classification Search
CPC ....... G06K 19/07754; G06K 19/07769; G06K 19/07775; G06K 19/0775; G06K 19/07745
See application file for complete search history.

(56) References Cited

U.S. PATENT DOCUMENTS 5,378,869 A * 1/1995 Marrs ................... B23K 26/382
219/121.71
7,958,622 B1 * 6/2011 Ayala ................. G06K 19/0775
235/492

(Continued)

FOREIGN PATENT DOCUMENTS

RU 2 251 743 C2 5/2005
RU 2 282 893 C2 8/2006

(Continued)

OTHER PUBLICATIONS

International Searching Authority, International Search Report (ISR) and Written Opinion received for International Application No. PCT/EP2019/077275, dated Dec. 17, 2019, 13 pages, European Patent Office, Netherlands.

(Continued)

*Primary Examiner* — Thien M Le
*Assistant Examiner* — Asifa Habib
(74) *Attorney, Agent, or Firm* — McDonnell Boehnen Hulbert & Berghoff LLP

(57) ABSTRACT

A process for manufacturing an electronic module intended to be implemented in a dual-interface portable object is provided. The process includes at least the following steps:
- Using a single-sided film consisting of one or more contact regions and a dielectric comprising one or more apertures,
- Using a substrate comprising one or more electrically conductive regions intended for the contactless communication of the object,
- Securing said single-sided film and said substrate together,
- Positioning an integrated circuit and connecting it to the contact regions of the single-sided film and at least to one terminal of at least one of said electrically conductive regions, (Continued)

Figure 1:
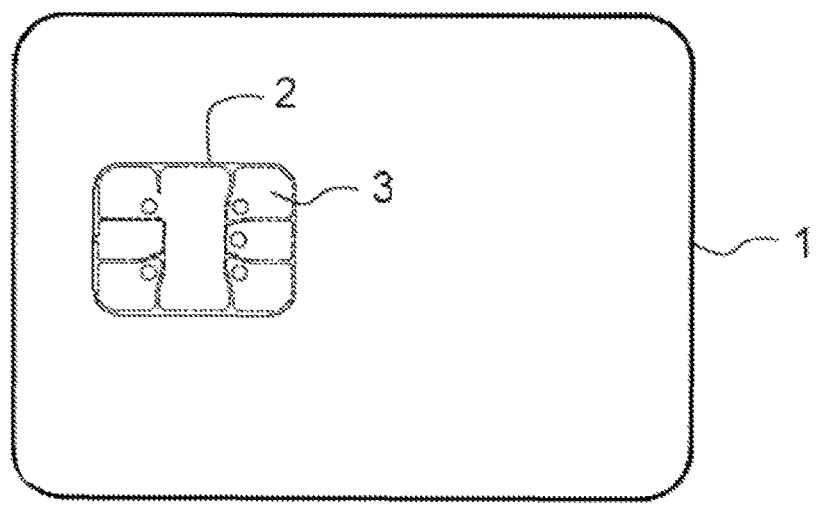

Depositing a protective layer incorporating at least said integrated circuit.

Also provided is a module obtained by means of the process.

20 Claims, 7 Drawing Sheets

(56) References Cited

U.S. PATENT DOCUMENTS

| | | | | |
|---|---|---|---|---|
| 9,583,459 | B2* | 2/2017 | Dieu-Gomont | H05K 1/028 |
| 10,592,796 | B2* | 3/2020 | Eymard | G06K 19/07769 |
| 2001/0012682 | A1* | 8/2001 | Kayanakis | G06K 19/08 |
| | | | | 438/585 |
| 2009/0200650 | A1* | 8/2009 | Tan | G06K 19/077 |
| | | | | 257/691 |
| 2015/0269471 | A1* | 9/2015 | Finn | B23K 26/0622 |
| | | | | 29/601 |
| 2016/0140431 | A1* | 5/2016 | Bousquet | G06K 19/0775 |
| | | | | 29/831 |
| 2017/0249545 | A1* | 8/2017 | Eymard | G06K 19/07769 |
| 2018/0032854 | A1* | 2/2018 | Pueschner | G06K 19/0775 |
| 2020/0250504 | A1* | 8/2020 | Lotya | G06K 19/02 |
| 2021/0056374 | A1* | 2/2021 | Lotya | H04B 5/77 |
| 2021/0192311 | A1* | 6/2021 | Lotya | G06K 19/07747 |
| 2023/0027226 | A1* | 1/2023 | Lotya | G06K 19/02 |

FOREIGN PATENT DOCUMENTS

| | | |
|---|---|---|
| WO | WO 2011/157693 A1 | 12/2011 |
| WO | WO 2014/191428 A1 | 12/2014 |

OTHER PUBLICATIONS

National Industrial Property Institute, Preliminary Search Report and Written Opinion received for French Application No. 1860297, Aug. 5, 2019, 8 pages, Republic of France.

English Translation of the Russian Search Report issued in Russian Patent Application No. 2021115602/28(032955) dated Mar. 16, 2022.

* cited by examiner

ELECTRONIC MODULE FOR CHIP CARD

CROSS-REFERENCE TO RELATED APPLICATIONS

The present application is a national phase entry of PCT/EP2019/077275, filed on Oct. 9, 2019, which claims the benefit of priority of French Application No. 1860297, filed Nov. 8, 2018, the entire contents of which are hereby incorporated by reference in their entirety for all purposes.

TECHNICAL FIELD

The invention relates to an electronic module for a portable object having a dual, contact and contactless, function, for example a chip card.

BACKGROUND

Electronic modules are generally produced on flexible printed circuit boards with one or two etched and metallized copper layers. The pads of the integrated circuit chip are electrically connected to the contact plates of the connection package by means of conductive wires. In order to be able to electrically connect the electronic module to another electrical circuit embedded in the card body, the electronic module further comprises an antenna or a pair of contact plates internal to the chip, arranged on the hidden face of the connection package. The antenna is electrically connected to the chip via pads and by means of conductive wires (wire bonding) or using a direct connection technique employing conductive balls or "bumps". The type of substrate used is generally quite expensive.

In the case of a dual-interface card, an antenna is integrated into the module and allows electromagnetic coupling with a "booster" antenna incorporated into the rigid support of the card.

Patent application WO 2011/157693 discloses a multi-layer printed circuit composed of a stack of a plurality of electrical layers and of insulating layers.

Patent application US 2015/269471 describes a structure of low thickness comprising an opening for positioning a chip.

BRIEF SUMMARY

The object of the invention is to provide a novel electronic module for a chip card and a novel manufacturing process which makes it possible to offer flexibility in the design of the antenna and also to decrease manufacturing costs by combining a single-sided film comprising the contacts with a complex comprising at least one electrically conductive region such as an antenna, while ensuring the usual contact and/or contactless functions.

The invention relates to a process for manufacturing an electronic module intended to be implemented in a dual-interface portable object, characterized in that it comprises at least the following steps:
  Using a single-sided film consisting of one or more contact regions and a dielectric comprising one or more apertures,
  Using a substrate comprising one or more electrically conductive regions intended for the contactless communication of the object,
  Securing said single-sided film and said substrate together,
  Positioning an integrated circuit and connecting it to the contact regions of the single-sided film and at least to one terminal of at least one of said electrically conductive regions,
  Depositing a protective layer incorporating at least said integrated circuit.

For example, use is made of a substrate comprising at least electrically conductive region consisting of turns forming an antenna and at least one contact pad located at least one end of the antenna.

According to one embodiment, at least one of said electrically conductive regions consists of at least one area of conductive material.

According to one variant embodiment, a region is cut out in the center of the at least one of said electrically conductive regions and the integrated circuit is bonded on the opposite face of the film bearing the contacts.

According to another variant, one or more apertures are made at the level of the substrate, the apertures corresponding to the apertures that are located in the film in order to constitute soldering wells between the integrated circuit and the contact regions.

For example, a substrate is used which has one or more electrically conductive regions made of aluminum to form the antenna or areas of conductive material.

The pattern of the electrically conductive region or the areas of conductive material may be produced using an etching technique, an additive process by means of screen printing or transfer.

The invention also relates to an electronic module intended to be implemented in a portable object comprising a contact function, characterized in that it comprises at least the following elements:
  A single-sided film consisting of one or more contact regions and a dielectric comprising one or more apertures,
  A substrate comprising one or more electrically conductive regions intended for contactless communication, said substrate being secured to the single-sided film,
  An integrated circuit connected to the contact regions of the single-sided film and at least to one terminal of at least one of said electrically conductive regions,
  A protective layer incorporating at least said integrated circuit.

The substrate comprises, for example, at least one of said electrically conductive regions in the form of turns comprising, at one end, a connection pad.

It may also comprise at least one of said electrically conductive regions consisting of at least one area of conductive material.

According to one variant embodiment, the substrate comprises a hollowed-out central region having a geometry adapted for accommodating an integrated circuit and the protective layer.

The substrate may also comprise one or more perforations corresponding to the apertures of the single-sided film in order to connect the integrated circuit to the contact regions.

The dielectric and/or the substrate are chosen from the following list: epoxy glass, polyethylene naphthalate PEN, polyethylene terephthalate PET, or polyvinyl chloride PVC, and the substrate bearing the antenna made of PET or PVC.

BRIEF DESCRIPTION OF THE SEVERAL VIEWS OF THE DRAWING(S)

Figure 2:
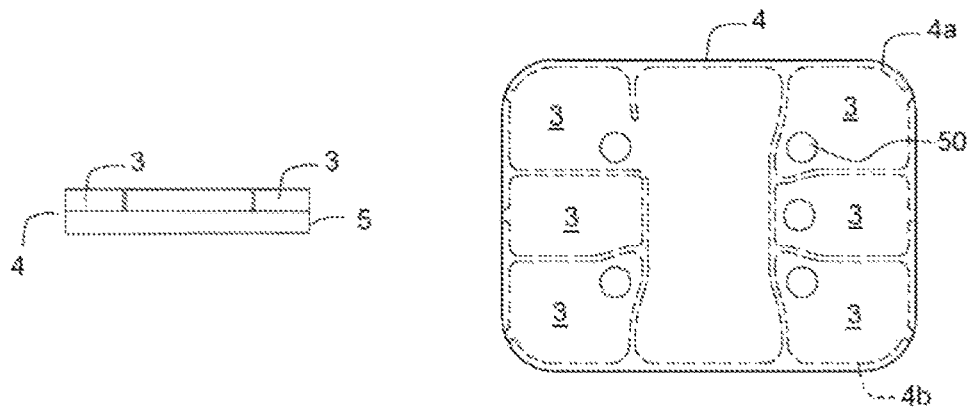
Figure 3A:
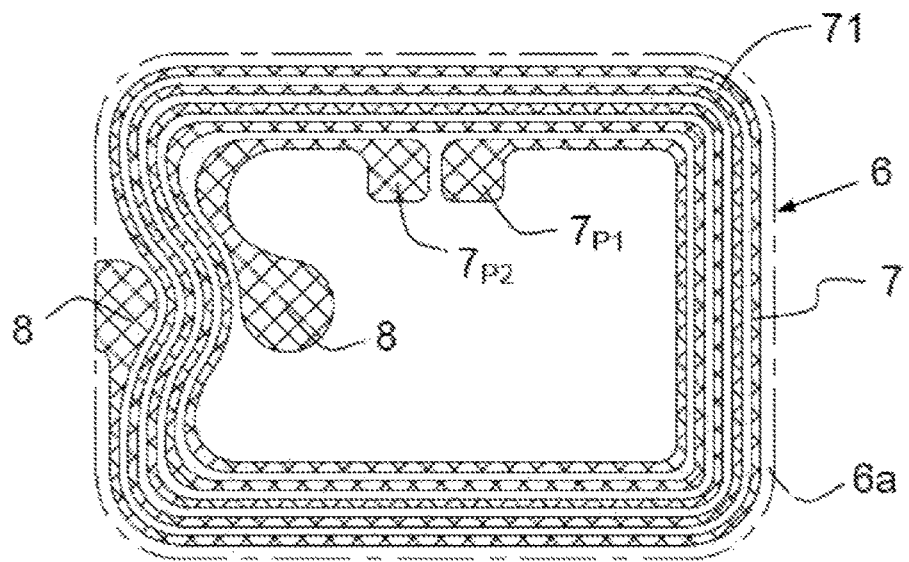
Figure 3B:
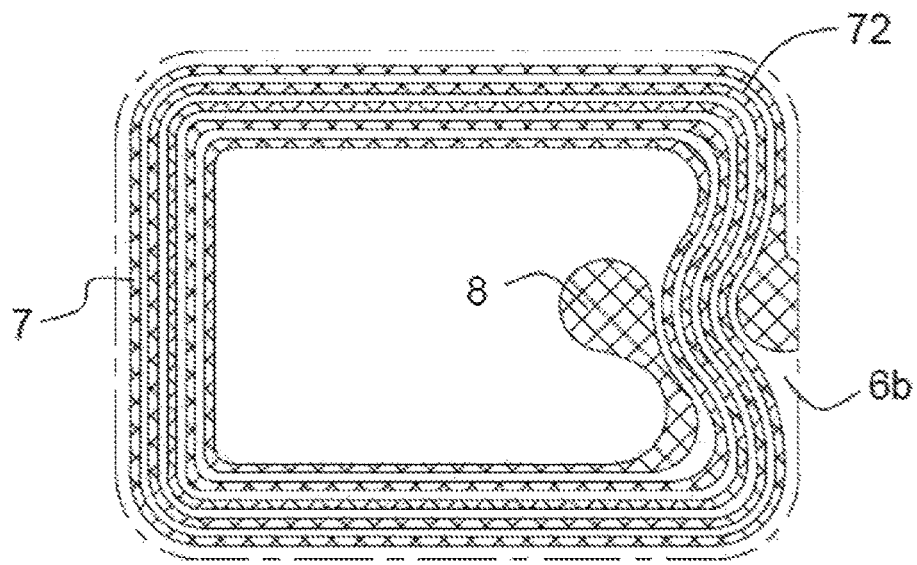
Figure 3C:
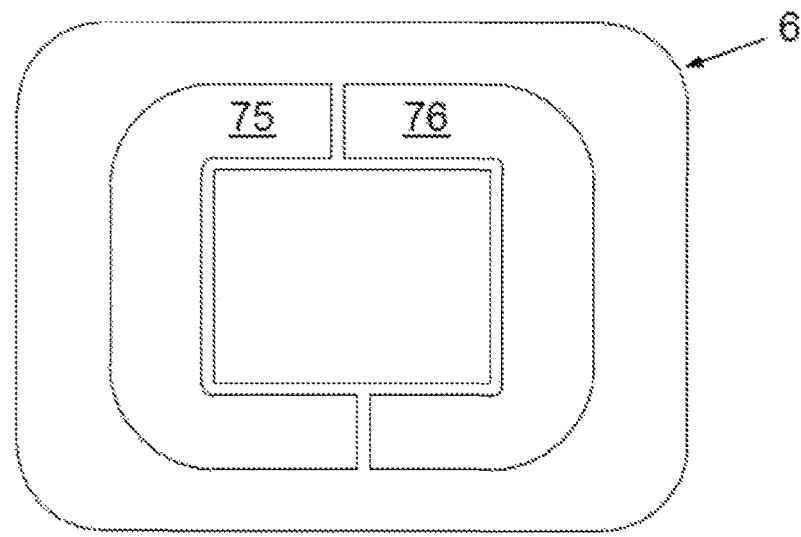
Figure 4A:
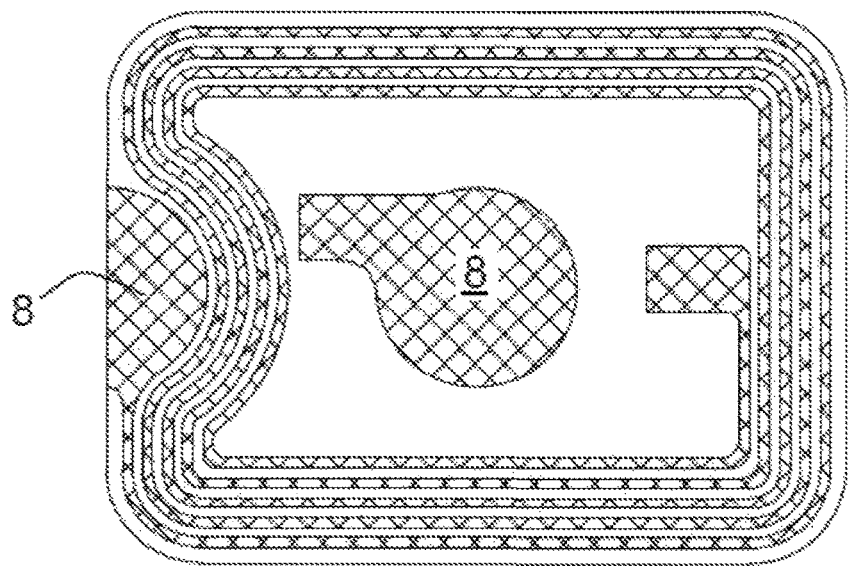
Figure 4B:
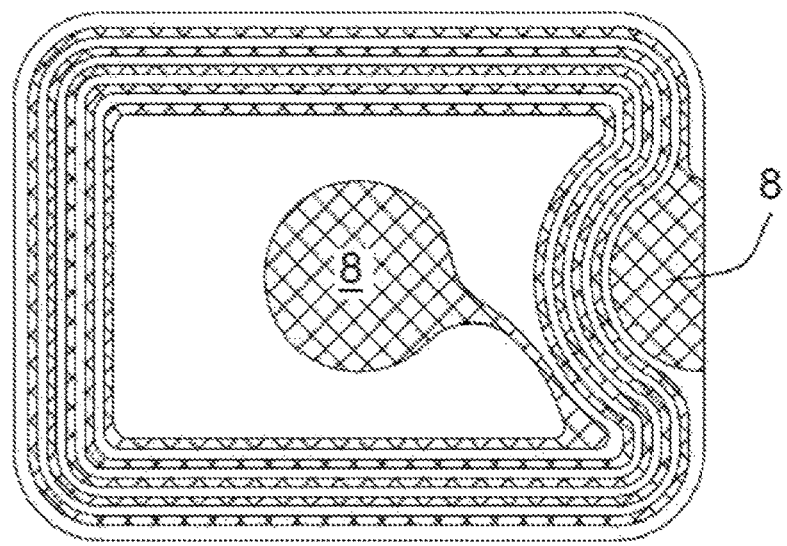
Figure 5:
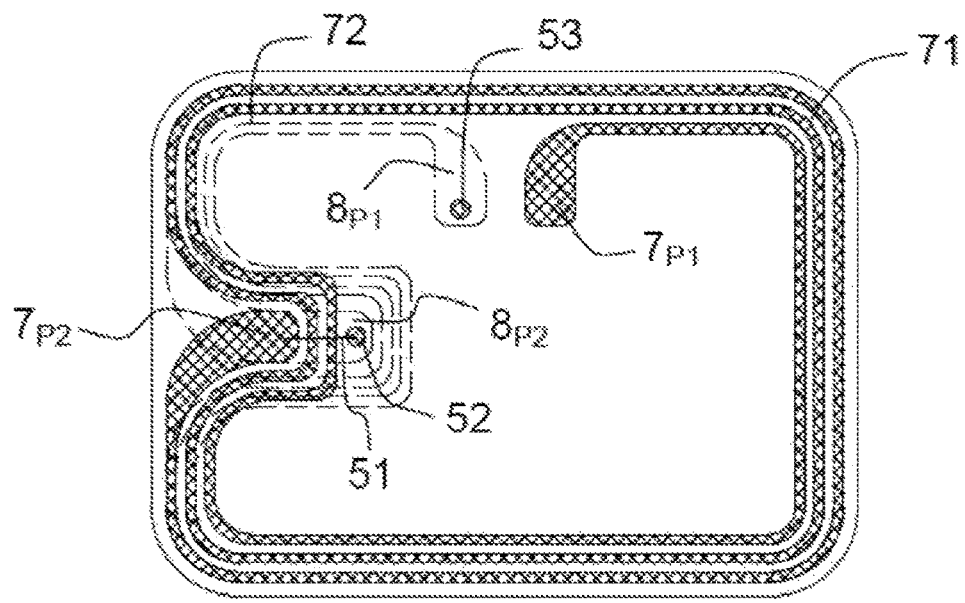
Figure 6:
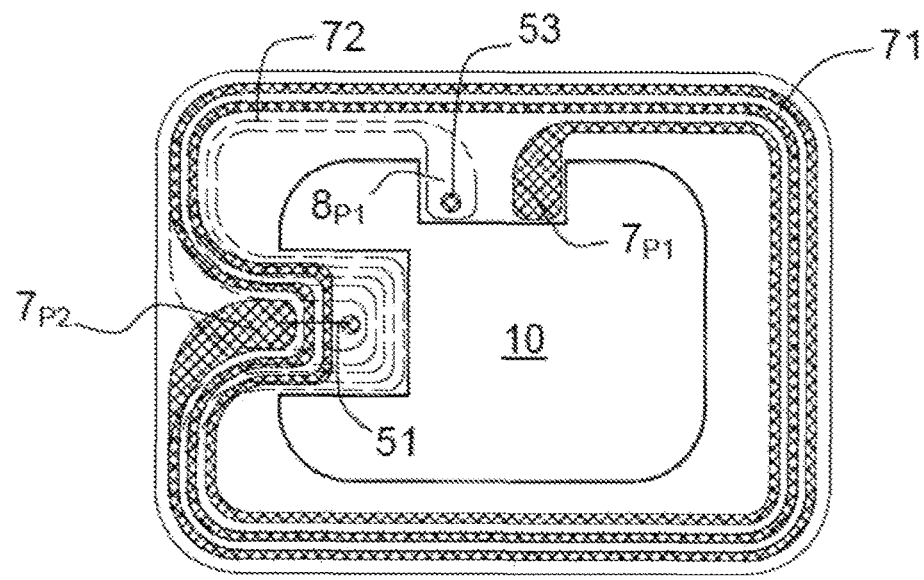
Figure 7:
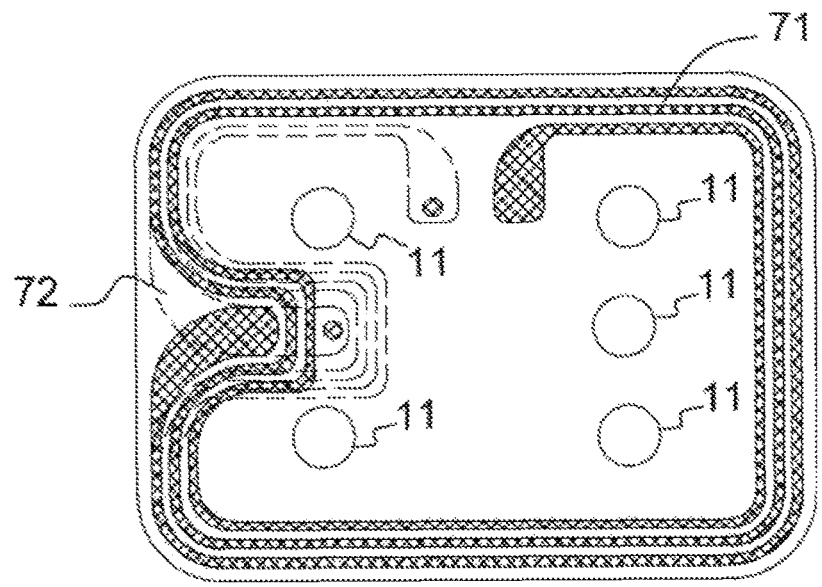
Figure 8:
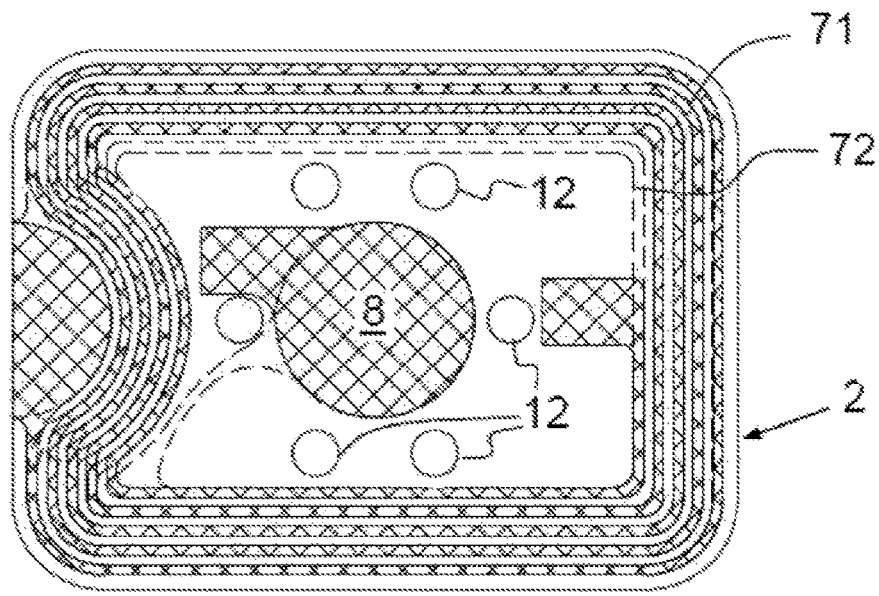
Figure 9:
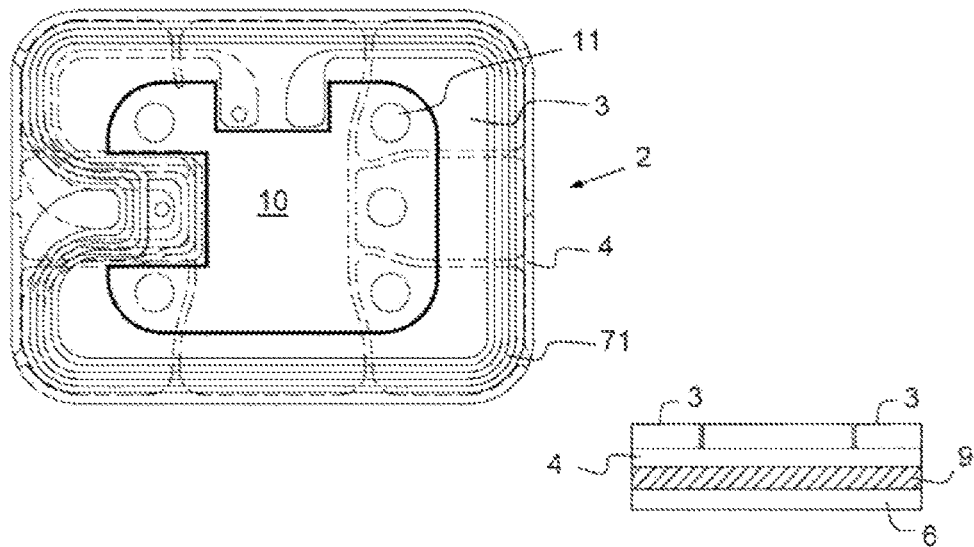
Figure 10:
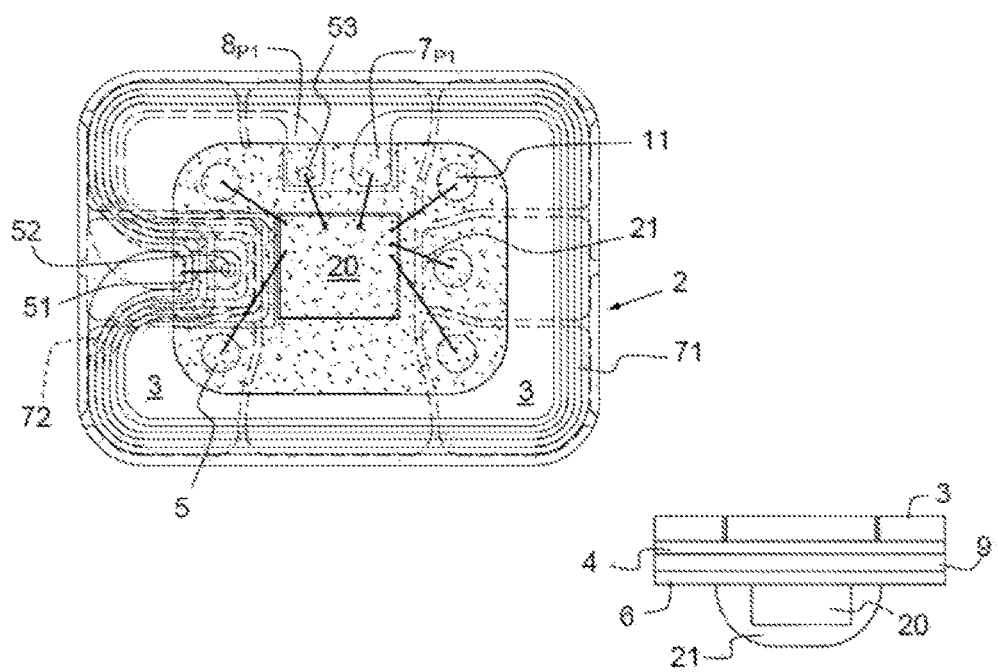

Other features and advantages of the present invention will become more clearly apparent from reading the description of exemplary embodiments provided by way of completely non-limiting illustration alongside the appended figures, in which:

FIG. 1 schematically shows a chip card comprising an electronic module according to the invention, FIG. 2 shows a front face of the electronic module, FIG. 3A and FIG. 3B show a film comprising an antenna according to a first embodiment and FIG. 3C shows a variant with metal lands for a contactless function, FIGS. 4A and 4B show another exemplary embodiment of a film with an antenna, FIG. 5 shows one variant embodiment avoiding crimp connections, FIG. 6 shows a representation of the film including the antenna, FIG. 7 shows an illustration of the production step comprising the piercing of apertures in the film bearing the antenna bonded to the rigid support of the module, FIG. 8 shows another illustration of FIG. 7, FIG. 9 shows a representation of the assembly of the film with contacts and the substrate comprising the one or more antennas, and FIG. 10 shows an illustration of the final module.

DETAILED DESCRIPTION

The following description is given by way of entirely non-limiting illustration for the production of a module for a dual-interface card. The steps described below may, without departing from the scope of the invention, be used for electronic modules intended for credit cards, SIM cards for mobile phones, transport cards, identity cards, etc.

For the sake of simplicity of the description, the figures show a single module, it being known that the antennas will, in most cases, be produced over a wide width (a few tens of cm to several meters), allowing higher production.

FIG. 1 illustrates a chip card 1 comprising at least one electronic module 2 obtained by implementing the process according to the invention. The electronic module 2 integrated into the chip card 1 has contacts 3 or contact regions at the level of the surface of the front face of the card in order to allow electrical connection thereof with a card reader, not shown for the sake of simplicity of the drawings.

FIG. 2 illustrates the single-sided film 4 with contact via its upper face, which face will make contact with the reader. The single-sided film 4 bears the contacts 3 which are produced on one face 4a and a dielectric 5 on the other face 4b. Openings 50 are made in the dielectric 5 in order to provide access to all or some of the contacts. The position and dimensions of the contacts of the module are defined by the standard associated with the use of the card, for example, the ISO standard.

The dielectric layer may also be a layer of polyimide or PI. Materials such as PEN (polyethylene naphthalate), PET (polyethylene terephthalate) or even PVC (polyvinyl chloride) may be used. The choice of the material of the dielectric layer is determined according to the cost and reliability trade-off associated with the compatibility with the materials which will be used for the assembly of the integrated circuit and the transfer of the module into the body of a card.

The production of the antenna 7 (FIGS. 3A, 3B) is performed separately from the manufacturing of the film comprising the contacts. The substrate 6 bearing the antenna will then be laminated onto the film bearing the contacts. For the production of the electronic module, a single substrate will be used for example.

FIGS. 3A and 3B illustrate a first face 6a and a second face 6b, respectively, of a substrate 6 bearing one or more electrically conductive regions such as two antennas 71, 72 (constituting the two faces of an antenna). The antenna 71 comprises two pads 7p1, 7p2, for connection. FIGS. 3A and 3B illustrate an "antenna module" which may be produced on a flexible support over a wide width as is known to those skilled in the art. The antenna is produced by using, for example, an etching technique or an additive process, a process where the surface of the desired pattern is activated in order to allow the growth of the conductor or the direct transfer of the conductor, by screen printing or transfer, for example.

The material used to produce the antenna will, for example, be aluminum or any other electrically conductive metal material exhibiting equivalent properties and which will be compatible with the adhesive material used to secure the film in contact with the substrate bearing the antenna.

The substrate bearing the antenna is a low-cost flexible support of PET or PVC type, or else made in one of the materials mentioned above for the dielectric.

According to a first variant embodiment illustrated in FIGS. 3A, 3B, for a two-sided antenna, the two antennas 71, 72 are connected by crimp 8 (electrical connection by crimping between jaws with force and ultrasound). Crimp regions may take the form of circular regions. The region at the edge of the module may be cut out when cutting the module.

FIG. 3C illustrates one variant embodiment in which the antenna of FIG. 3A is replaced with at least one electrically conductive, metal area allowing communication for a contactless function of the portable object. The metal land may consist of two electrically conductive, metal areas 75, 76, as shown in FIG. 3C. The two areas form two connection pads for a contactless function or allow capacitive coupling with a booster antenna integrated into the card body.

FIGS. 4A and 4B illustrate a second variant embodiment in which the regions of crimps 8 have a larger area, thus increasing the performance of the electrical connection.

FIG. 5 schematically shows another variant embodiment, with a two-sided antenna 71, 72, one of the faces 72 of the antenna being illustrated in dashed line. The interconnection of the two antennas is achieved by using a wire or "strap" 51 that passes through a first opening 52 or via. The chip 20 (FIG. 10) will be connected to one end of the antenna 71 located on a first face by means of a connection pad 7p1 and to a pad 8p1 of the antenna 72 located on the second face, through an aperture 53 or via. The vias 52, 53 may be produced at the same time as the production of the antenna, for example by laser sweeping. Instead of the strap, it is possible to use a crimp (identical to that of FIG. 3A) to connect the two antennas 71, 72 constituting the antenna. Two regions of the rear metal face are uncovered and cleaned by means of a combination of processes which may include laser, plasma, a chemical technique.

The support bearing the contacts shown in FIG. 1 and the substrate bearing the antenna are then laminated together.

For that, an adhesive means 9 (adhesive layer in FIG. 9) is deposited on one face of the substrate 6 bearing the antenna in order to secure it to the rear face 4b of the contact film 4.

According to one variant embodiment illustrated in FIG. 6, a portion 10 is cut out in the center of the antenna in order to allow the direct bonding of a chip 20 (FIG. 10).

The cutting out of the opening may be performed using a laser technique and simultaneously with that of the exposed regions illustrated in FIG. 5.

This type of cut-out will allow the chip to be bonded (soldered) directly to the dielectric (rear face 4b—FIG. 1) of the film bearing the contacts. The adhesion of the chip will not be diminished by the additional adhesive and dielectric layers. The ultimate thickness of the product will be decreased due to the absence of intermediate layers between the chip and the contact film.

Furthermore, this cut-out forms a region which serves as a visual reference and physically delimits the deposit of the protective layer 21 for the chip and the connections. The coating material or resin will benefit from good adhesion to the dielectrics known to those skilled in the art and fully understood, of film type.

According to another variant embodiment, the dielectric is open only at the level of the soldering wells. FIG. 7 illustrates the perforations 11 made at the level of the substrate, revealing soldering wells. These will be used to connect the chip to the contact pads according to a technique known to those skilled in the art. The number of soldering wells will be chosen according to the application.

FIG. 8 illustrates another variant where the perforations 12 are distributed around a central crimp 8.

The antennas thus formed may be bonded to the contact film, as illustrated in FIG. 9. The support is recut to the format compatible with the assembly, Super 35 mm film format known to those skilled in the art for example, to form the dual-interface film.

FIG. 10 illustrates a view from above of the result of the assembling of the electronic module. A chip 20 is bonded to the face of the film opposite the face bearing the contacts, then wired to the pads 7p1, 8p2 of the antenna 71, 72 and via the soldering wells 11 to the contacts 3. The two faces of the antenna are interconnected. An encapsulation resin is then provided which protects the chip and the connections.

The steps described above may be adapted by a person skilled in the art to the case of a single-sided antenna. The single-sided film may be a simple frame in a complex with a dielectric.

Without departing from the scope of the invention, the steps described above apply for an antenna consisting of two connection pads.

The antenna may also consist of two areas having a geometry and dimensions chosen to achieve capacitive coupling with a booster antenna placed at the core of the card. The regions will be positioned for example around the integrated circuit or chip.

The process according to the invention, and the electronic module obtained by the implementation thereof have notably the advantage of decreasing production costs and flexibility in the design of the antennas.

The invention claimed is:

1. A process for manufacturing an electronic module intended to be implemented in a dual-interface portable object, the process comprising:
    providing a film, wherein the film comprises:
        one or more contacts on a first face of the film; and
        a dielectric layer on a second face of the film;
    piercing the dielectric layer to define one or more apertures therein;
    providing a substrate bearing an antenna, wherein the substrate is distinct from the dielectric layer, wherein the antenna comprises a crimp, and wherein the crimp is formed by one or more circular regions;
    adhering the dielectric layer to the substrate;
    cutting out a region of the substrate in a center of at least a portion of the antenna;
    positioning an integrated circuit within the cut-out region of the substrate;
    bonding the integrated circuit to the dielectric layer;
    connecting the integrated circuit to the contacts;
    connecting the integrated circuit to at least one terminal of the antenna; and
    depositing a protective layer that covers the integrated circuit.

2. The process as claimed in claim 1, wherein the antenna comprises at least one contact pad located at at least one end of the antenna.

3. The process as claimed in claim 1, wherein the antenna consists of one area of conductive material.

4. The process as claimed in claim 1, further comprising perforating the substrate to define one or more apertures in the substrate that correspond to the apertures that are defined in the dielectric layer, wherein the one or more apertures in the substrate form soldering wells between the integrated circuit and the contacts.

5. The process as claimed in claim 4, wherein the apertures in the substrate are distributed around the crimp.

6. The process as claimed in claim 4, wherein perforating the substrate comprises laser sweeping.

7. The process as claimed in claim 1, wherein the antenna comprises aluminum.

8. The process as claimed in claim 1, wherein a pattern of the antenna is produced using an etching technique or an additive process.

9. The process as claimed in claim 1, wherein a pattern of the antenna is produced using screen printing or transfer.

10. The process as claimed in claim 1, wherein the substrate comprises polyethylene terephthalate (PET) or polyvinyl chloride (PVC).

11. The process as claimed in claim 1, further comprising cleaning the antenna using laser, plasma, or chemical techniques.

12. An electronic module intended to be implemented in a portable object comprising a contact function, the electronic module comprising:
    a film comprising:
        one or more contacts on a first face of the film; and
        a dielectric layer on a second face of the film, wherein the dielectric layer has one or more apertures defined therein;
    a substrate bearing an antenna, wherein the substrate is distinct from the dielectric layer, wherein the dielectric layer is adhered to the substrate, wherein the antenna comprises a crimp, and wherein the crimp is formed by one or more circular regions;
    an integrated circuit positioned within a region cut out of the substrate and bonded to the dielectric layer, wherein the cut-out region of the substrate is in a center of at least a portion of the antenna, and wherein the integrated circuit is connected to the contacts of the film and to at least one terminal of the antenna; and
    a protective layer that covers the integrated circuit.

13. The module as claimed in claim 12, wherein the antenna comprises
    at least one contact pad located at at least one end of the antenna.

14. The module as claimed in claim 12, wherein the antenna consists of one area of conductive material.

15. The module as claimed in claim 12, wherein the substrate comprises one or more perforations defining one or more apertures in the substrate that correspond to the apertures that are defined in the dielectric layer, wherein the one or more apertures in the substrate form soldering wells between the integrated circuit and the contacts.

16. The module as claimed in claim 15, wherein the one or more perforations were defined by laser sweeping.

17. The module as claimed in claim 12, wherein the dielectric layer comprises epoxy glass, polyethylene naphthalate (PEN), polyethylene terephthalate (PET), or polyvinyl chloride (PVC).

18. The module as claimed in claim 12, wherein the substrate comprises polyethylene terephthalate (PET) or polyvinyl chloride (PVC).

19. The module as claimed in claim 12, wherein the crimp is located near a center of the substrate.

20. The process as claimed in claim 1, wherein the crimp is located near a center of the substrate.

* * * * *